United States Patent [19]

Impink, Jr. et al.

[11] Patent Number: 4,839,134

[45] Date of Patent: Jun. 13, 1989

[54] CONTINUOUS, ONLINE NUCLEAR POWER DISTRIBUTION SYNTHESIS SYSTEM AND METHOD

[75] Inventors: Albert J. Impink, Jr., Murrysville; Louis R. Grobmyer, North Huntingdon, both of Pa.

[73] Assignee: Westinghouse Electric Corp., Pittsburgh, Pa.

[21] Appl. No.: 140,065

[22] Filed: Dec. 31, 1987

[51] Int. Cl.$^4$ .............................................. G21C 7/36
[52] U.S. Cl. .................................. 376/216; 376/247; 376/254
[58] Field of Search ............... 376/215, 216, 217, 247, 376/254

[56] References Cited

U.S. PATENT DOCUMENTS

| | | | |
|---|---|---|---|
| 3,932,211 | 1/1976 | Loving | 376/215 |
| 4,069,097 | 1/1978 | Frank | 376/215 |
| 4,637,910 | 1/1987 | Impink | 376/216 |
| 4,700,174 | 10/1987 | Sutnerlawk | 376/259 |
| 4,774,049 | 9/1988 | Impink | 376/245 |

OTHER PUBLICATIONS

R. A. Kerr, Excore Detector Recalibration Using Quarter-Core Flux Maps.

Primary Examiner—Donald P. Walsh

[57] ABSTRACT

The present invention provides a power distribution synthesis system that uses a small number of local axial power distributions determined from less than a full complement of fixed incore neutron detectors and a power sharing map produced from a full complement of core exit thermocouple temperature signals to synthesize the full core power distribution. The localized tilt of the core is determined from the power sharing map and used to remove the tilt from the local distribution. The tilt adjusted local distribution is assigned to symmetric core locations where uninstrumented core power values are determined by interpolation. The interpolated, assigned and tilt corrected local distribution power values are transformed into the three dimensional power distribution using the tilt.

6 Claims, 7 Drawing Sheets

CONTINUOUS, ONLINE NUCLEAR POWER DISTRIBUTION SYNTHESIS SYSTEM AND METHOD

CROSS-REFERENCES TO RELATED DISCLOSURES

This application is related to U.S. application Ser. No. 850,195, filed Apr. 18, 1986, by Impink, Jr.; U.S. U.S. Pat. Nos. 4,774,049, filed Apr. 10, 1986, by Impink Jr. et al; and 4,700,174 by Southerland et al, all assigned to Westinghouse Electric Corporation and all incorporated by reference herein.

BACKGROUND OF THE INVENTION

1. Field of the Invention

The present invention is directed to a nuclear power plant core power distribution mapping and display system and, more particularly, to a system that uses a limited number of fixed incore detectors and core exit thermocouples to synthesize a full core power distribution.

2. Description of the Related Art

The use of many strings of fixed incore neutron or gamma ray sensitive detectors to continuously monitor the three dimensional nuclear power distribution in a nuclear power reactor core is common. In applying the concept of continuous, online power distribution monitoring with the aid of fixed incore detectors, it is normal practice to install one string, containing four to seven individual detectors located axiallly over the span of the core height, for every three to four fuel assemblies in the core. One can expect to find fifty to sixty such strings of detectors in a large (1000 MWe) nuclear power reactor core. Such an arrangement of detector strings is called a full complement of fixed incore detectors. With a suitably large number of strings of detectors installed and with the conventional digital computer software and hardware presently available, it is possible to generate and update on a one to two minute cycle a full three dimensional core power distribution representation with sufficient accuracy and precision to allow system designers to reduce the uncertainty penalties imposed on the operating power safety margins incorporated in their designs. This then also allows reduction in operating constraints imposed to account for uncertainties in power distribution and provides the operators of these full string complement facilities with additional operating space, that is, provides a larger range of safe operation.

The additional operating space made available by the continuous, online use of installed fixed incore detectors can be utilized to improve plant availability and responsiveness to load changes and reduce the costs of replacement power. However, the costs of the large number of fixed incore detector strings and the supporting electronics for signal sampling and transmission to the computing system are relatively large and, in a nominally base load operating environment, it is not clear that the benefits obtainable from the described system outweigh the costs by any economically significant amount.

For this reason, some manufacturers do not supply a full complement of fixed incore detectors as standard equipment, but rather provide a movable incore detector system by which miniature neutron detectors are mechanically moved through special instrumentation thimbles in selected fuel assemblies. The traces obtained by recording detector output current as the detectors are passed through the entire height of the core in each of the many such instrumentation thimbles can then be used to synthesize the three dimensional core power distribution that existed at the time of mapping and to demonstrate (after the fact) that the core power distribution was safely within the prescribed operating limits.

The costs associated with a movable incore detector system are lower than those of a full complement fixed incore detector system by a factor of perhaps two to three and the accuracy and precision of the synthesized core power distributions are at least as high as is obtainable with fixed incore detector systems. However, the mechanical components of the movable incore detector system are subject to wear and so use of the system is necessarily limited. Continuous monitoring of the core power distribution with a movable detector system over the life span of a nuclear power plant is at best impractical and probably not achievable without periodic replacement of the mechanical and neutron sensing components which increases system cost.

What is desired is a means for continuously synthesizing the core three dimensional power distribution with degrees of accuracy and precision comparable to those obtainable with a full complement fixed incore detector system or a movable incore detector system at a plant lifetime cost substantially less than that of a full incore detector system and at only a modest increment over the initial cost of a movable incore detector system. The system should be such that the use of an already installed movable incore detector system can be reduced, on the average, during the remainder of plant life span to reduce maintenance costs and radiation exposure of maintenance personnel.

U.S. Pat. No. 4,774,049 describes an approach to continuous full core power distribution synthesis based on: (1) the use of signals from excore neutron detectors, supplemented as necessary by signals from selected core exit thermocouples, to synthesize peripheral axial power distributions; (2) the use of a library of X-Y multiplier values to propagate the synthesized axial power distributions transversely to regions of the core other than those in the field of vision of the excore neutron detectors; and (3) the use of the full complement of core exit thermocouples to adjust, in the X-Y sense, the constructed three dimensional core power distribution to account for existing X-Y tilts in the actual core power distribution.

Even though the methodology of U.S. Pat. No. 4,774,049 will yield synthesized core power distributions of sufficient accuracy and precision to meet power distribution surveillance requirements and to obtain for the operator a relaxation of existing, restrictive technical operating specifications, it will not achieve the degree of accuracy and precision obtainable with either a full fixed incore detector system or a movable detector system. If one or more strings of fixed incore detectors are operational in a core being monitored, the signals from the fixed incore detectors could be used in the same way as the signals from the excore detectors, i.e., to synthesize local axial power distributions.

Another conventional method of core mapping using the movable incore detector system is called "quarter core" flux mapping. "Quarter core" flux mapping with a movable detector system is appropriate during periods of transient reactor operation where good accuracy and precision in measurements of the core average axial power distribution are needed and when comparable accuracy and precision in the X-Y components of the core power distribution can be sacrificed to some degree. A typical application of quarter core flux mapping is in the incore/excore axial offset calibration procedure conducted periodically in all Westinghouse reactors. A description of this type of mapping is provided in Westinghouse Report WCAP 8648 entitled "Excore Detector Recalibration Using Quarter Core Flux Maps" by R. A. Kerr 1976 and can be found in the public document room of Nuclear Regulatory Commission. Making a quarter core flux map includes obtaining detector response traces at a limited number of X-Y locations in the core. Typically two or three passes along the Z axis are made with each movable detector drive, yielding in a normal four loop core no more than twelve or eighteen traces. Each normalized trace in each of the core quadrants is translated to symmetric X-Y locations in each of the other three quadrants. The local axial power distributions derived from the actual and translated traces are interpolated and/or extrapolated to produce a full three dimensional core power distribution.

The deficiencies of quarter core flux mapping, as compared to full core flux mapping, in which all accessible thimbles are indeed accessed by the movable detector system and detector responses at all available X-Y locations are recorded, are two fold: (1) the data available for normalization of the respective detector response traces are incomplete, since a total of six passes by each of the movable detector drives (in a four loop plant) is necessary to obtain direct intercalibration of all detectors in a mutually common thimble; and (2) information regarding true X-Y or azimuthal tilts in the actual core power distribution is lost in the trace transfer process. Regardless of reality, the synthesized core power distribution will show azimuthal symmetry from quadrant to quadrant.

SUMMARY OF THE INVENTION

It is an object of the present invention to produce a complete core power distribution map from less than a full complement of incore flux detectors and from a full complement of core exit thermocouples.

It is another object of the present invention to reduce equipment costs of power distribution mapping without sacrificing accuracy.

It is an additional object of the present invention to allow economical retrofitting of nuclear reactors to allow production of a full core power distribution without the need for newly installed equipment.

It is a further object of the present invention to ensure that errors resulting from incomplete calibration of flux detectors are held to a minimum and to permit continuous online power distribution synthesis.

The above objects can be accomplished by a power distribution synthesis system that uses the local axial power distribution and power sharing map to synthesize the full core power distribution. The local axial power distribution produced by the fixed incore detectors throughout the core are mapped or transformed to symmetric locations within the core. Any X-Y tilt in the core is explicitly accounted for by the use of thermocouples. The power distribution values of the fixed detectors and transformed power distribution values are interpolated elevation by elevation to obtain the local power distribution in nearby core locations and then the interpolated, transformed and actual power distributions are transformed into tilt corrected distributions providing a complete three-dimensional power distribution map which can be reviewed by the operator.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
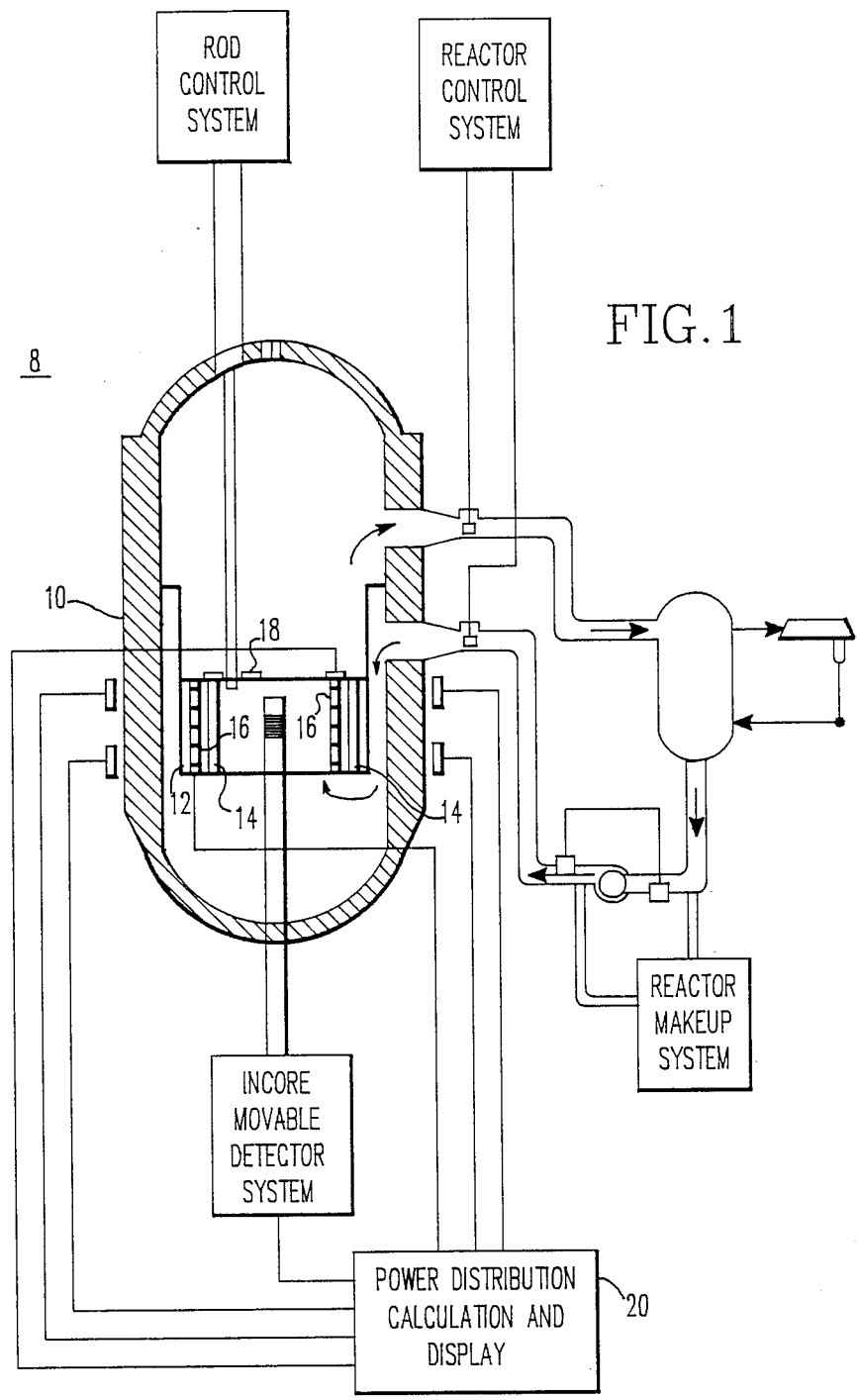
FIG. 1 illustrates a nuclear reactor system 8 to which the present invention is applied.

A nuclear reactor containment vessel 10 includes a nuclear reactor core 12 which is monitored by various reactor state detectors. The reactor core 12 includes fuel assemblies 14 some of which are monitored by conventional fixed incore detector strings 16 permanently mounted along the axis of each fuel assembly 14. Cooling water flows through the reactor core 12 along the axis of the core 12 as indicated by the water flow arrows, and the temperature of the water is monitored by a full complement of core exit thermocouples 18. A full complement of thermocouples typically monitors from twenty-five to thirty-five percent of the core exits. The signals from the thermocouples 18 and fixed incore detectors 16 are conventionally digitized and used, in accordance with the present invention, to determine the full core power distribution by a reactor power distribution calculation and display system 20. The distribution calculation and display system 20 uses the conventional computers and sampling equipment used in the quarter core or full string complement mapping systems previously discussed.

Figures 2, 3:
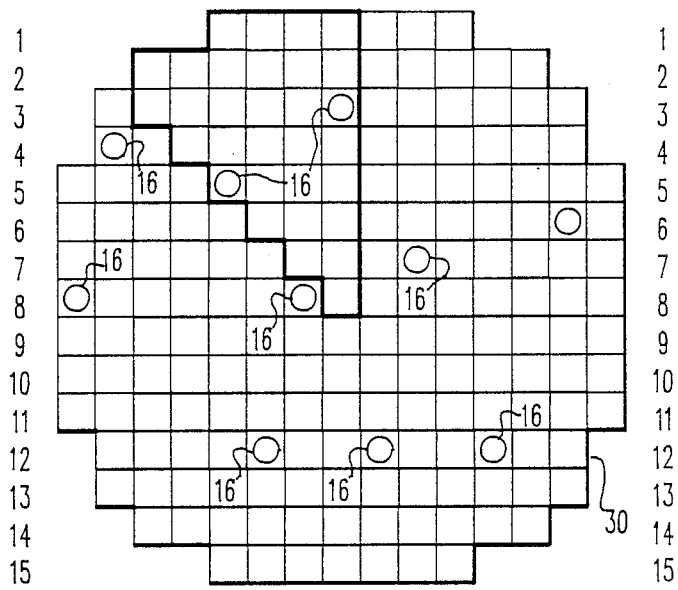
FIG. 2 illustrates an arrangement of fixed incore detectors 16 in a typical reactor core 30 when $\frac{1}{8}$ core symmetry is possible.
FIG. 3 demonstrates the adequate detector core coverage provided by the detector distribution of FIG. 2.

The present invention requires adequate coverage of the core by the fixed incore detectors 16. FIG. 2 illustrates an arrangement of 10 fixed incore detector strings 16 distributed among 193 fuel assemblies in an arrangement which provides adequate coverage when the core is eighth core symmetric. Adequate core coverage is generally determined by reflecting or rotating the X-Y locations of the detector strings into a single segment of the core, as illustrated in FIG. 3. The transferred detector string locations are shown again as circles and the numbers in the uninstrumented fuel locations are measures of the degree of coverage of the respective locations with respect to the translated string locations. In this evaluation of the degree of coverage at a given location, a contribution of 1 to the degree of coverage is counted for each detector string in a laterally adjacent assembly and a contribution of $\frac{1}{2}$ is counted for each detector string in a diagonally adjacent assembly. Fixed incore detector strings 16 in fuel locations more than a king's move from the location in question are assigned no value in evaluating coverage. While the coverage in the eighth core is at least comparable to the coverage obtainable in the full core with the movable detector system, loss of even one string would, in a number of cases, result in inadequate and unacceptable coverage of one or more fuel locations.

Figure 4:
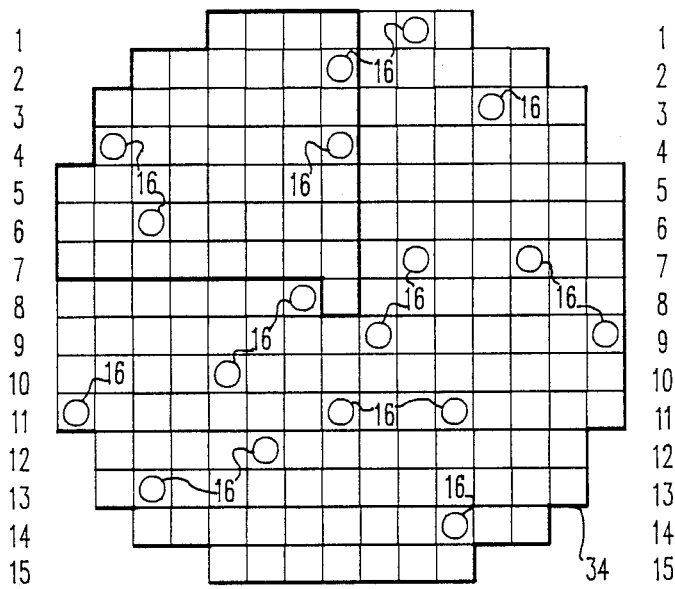
FIG. 4 shows a detector 16 arrangement when $\frac{1}{4}$ core symmetry is possible.
Figure 5:
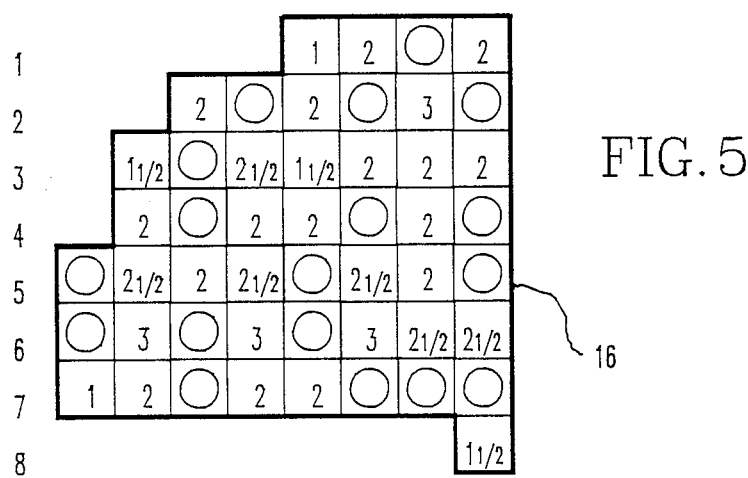
FIG. 5 demonstrates that the coverage provided by the arrangement of FIG. 4 is adequate.

FIG. 4 shows a core arrangement for a total of 18 strings of fixed incore detectors (which is only about 30% of a full complement of detector strings). FIG. 5 shows the result of translating the X-Y locations of the strings by reflection and/or rotation into a single quadrant (as opposed to an octant) of the core. Use of a quadrant extends the application of the proposed system to reactor cores that are only quarter core symmetric rather than limiting the application to the more restrictive case of cores that are eighth core symmetric. Again, the degree of coverage in uninstrumented assembly locations is indicated by the numbers in the respective locations. Less evident, but readily demonstratable, is the fact that coverage comparable to that obtainable with current movable detector systems is obtainable at all locations in the quarter core even in the event of failure of any single string of fixed incore detectors and of failure of almost all combinations of two detector strings. A detailed description concerning how to quanitatively measure the adequacy of coverage to ensure that this contraint is met can be found in U.S. Pat. No. 4,637,910 incorporated by reference herein.

Figure 6:
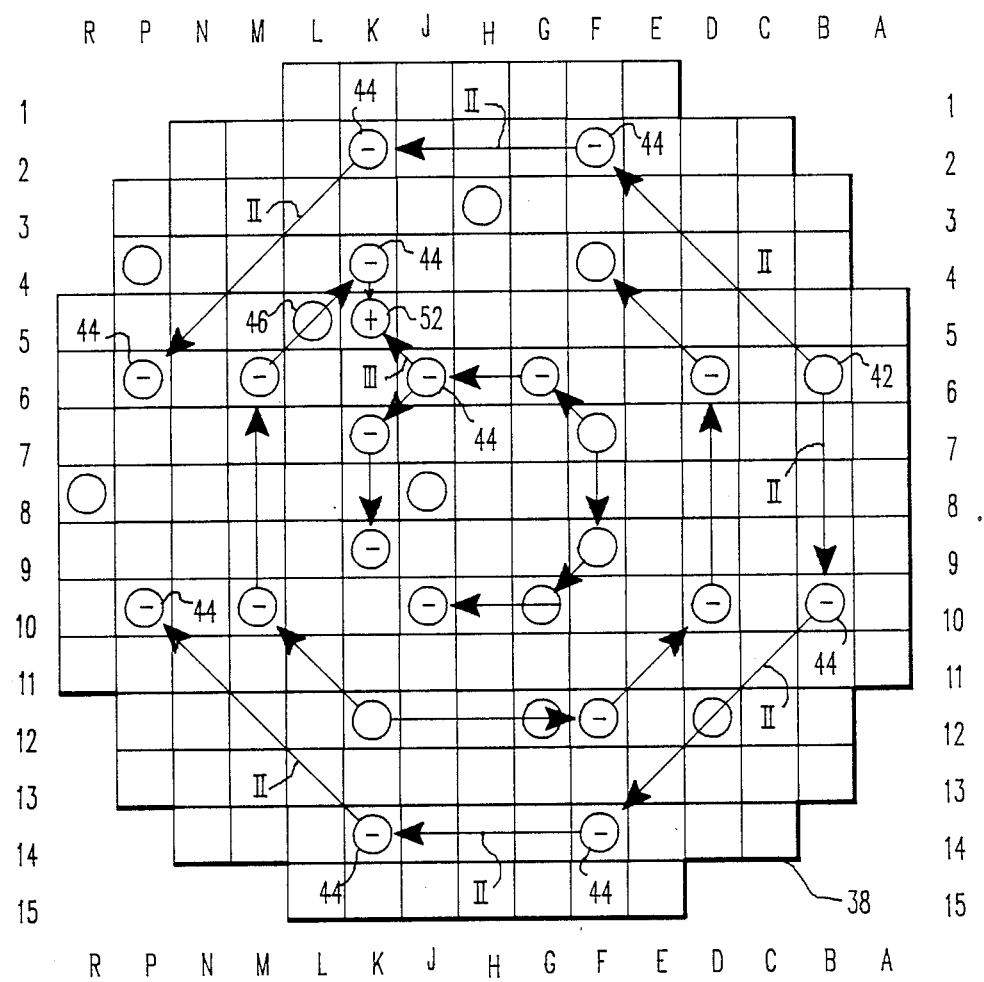
FIG. 6 depicts a portion of the sequence of transformations which occur in accordance with the present invention.

A part of the transformation method of the present invention when eighth core symmetry is available is graphically illustrated in FIG. 6. FIG. 6 illustrates an X-Y slice through the core perpindicular to the Z- axis of the core. The local assembly average axial power distribution value associated with each fixed string 42 (not shown) is adjusted I to remove any tilt in the core at that location. The tilt adjusted value associated with each fixed string 42 is then assigned II to symmetric locations 44 locations throughout the core. The symmetrically translated power distribution values 44 along with other symmetrically transformed power distribution values and the tilt adjusted power values of actual strings 46 are used to produce III interpolated values 52. The tilt adjusted actual, transformed and interpolated power distribution values are then adjusted IV to reintroduce the tilt previously removed and then the overall three dimensional power distribution is provided to the operator using a conventional display which allows viewing a three dimensional distribution.

Figure 7A:
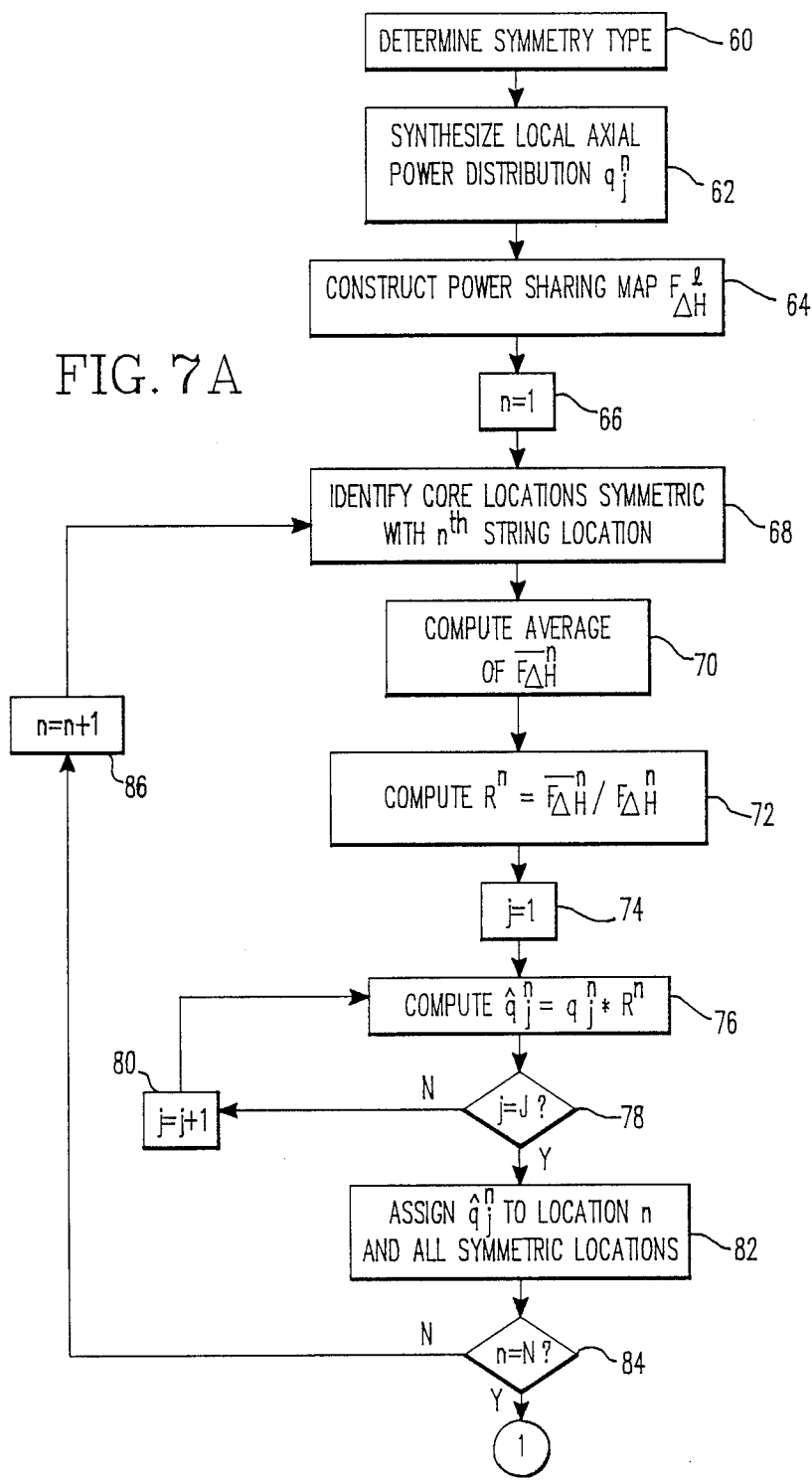
FIGS. 7A–7C combine to produce a flowchart of the calculations performed by the present invention.
Figure 7B:
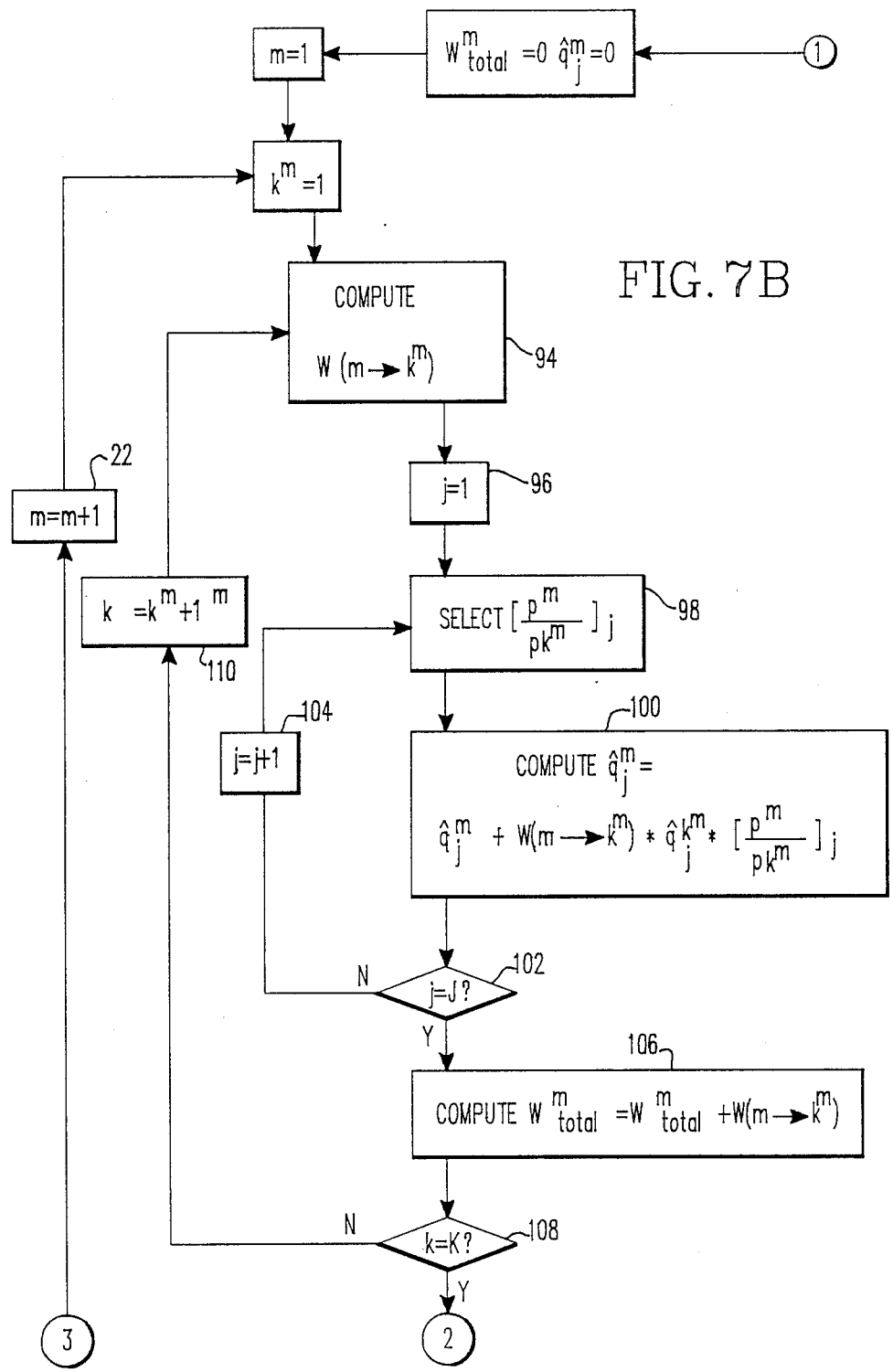
Figure 7C:
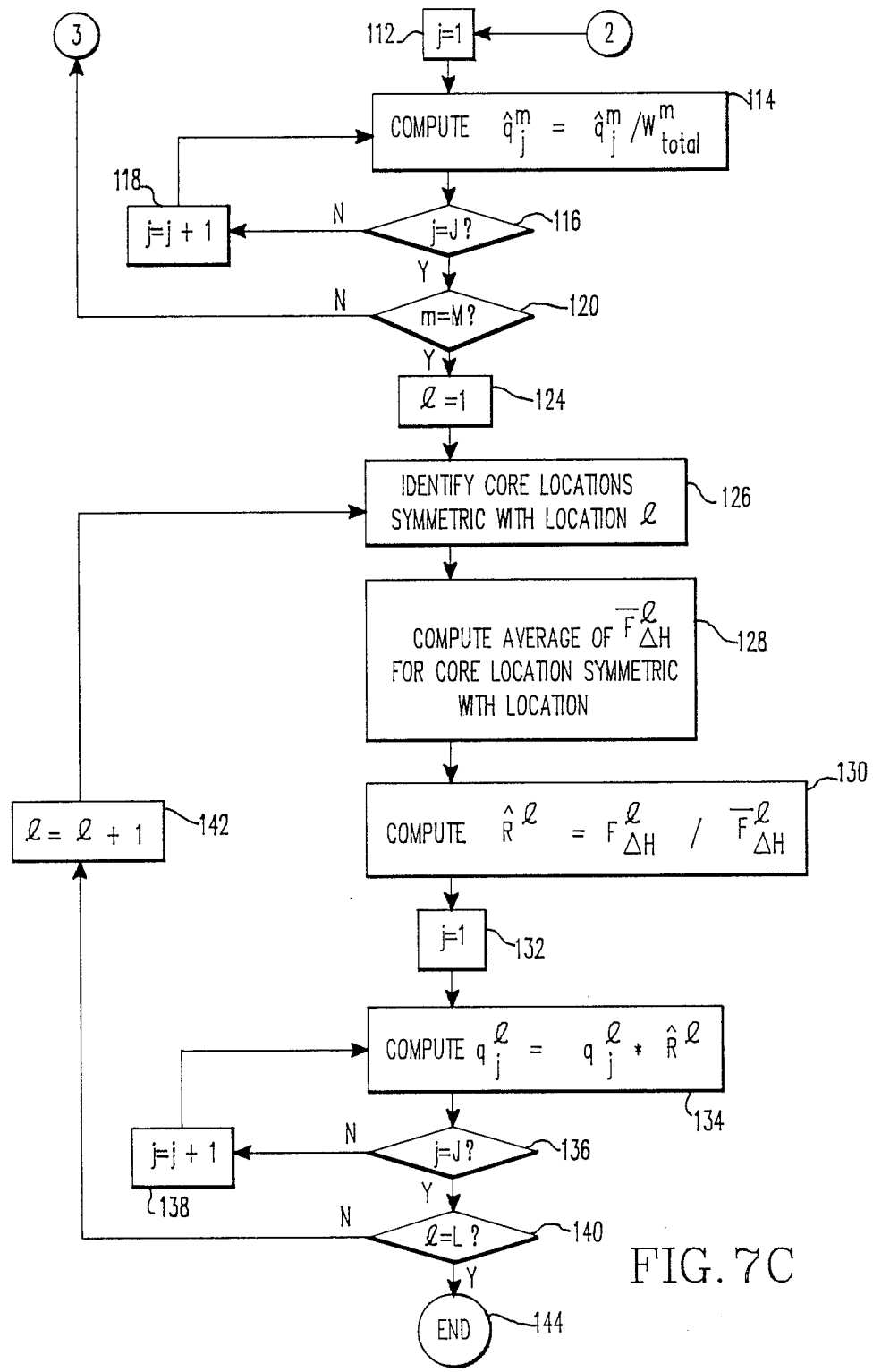

FIG. 7 is a detailed flowchart of the operation illustrated by FIG. 6. The symmetry type is determined 60 where symmetry requires conventional geometric symmetry and virtually identical fuel types, that is, the fuel assemblies should have the same enrichment, burn up, etc. The present invention will operate with eighth-core, quarter-core and half-core symmetry. Half-core symmetry may be the best symmetry obtainable because all the fuel assemblies in geometrically symmetrical locations may not be nominally identical after several fuel cycles have occurred. After the type of symmetry is identified, the local axial power distribution is synthesized 62 using the fixed incore detector flux values and possibly exit thermocouple temperature values in the method described in U.S. Pat. No. 4,700,174 for each fuel assembly that contains an active string of fixed incore detectors 16. The local axial power distributions can be generated by several different known methods. An assemblywise power sharing map is then constructed 64 using the thermocouple temperature signals as described in detail in U.S. application Ser. No. 850,196.

After the power sharing map is constructed a loop is entered in which the transformation of local power distribution values from existing incore detector locations to the symmetric core locations is performed. Prior to entering the loop, an index n which identifies a particular string of detectors is initalized 66. Depending on the type of symmetry being used, the symmetric core locations for the $n^{th}$ string are identified 68. One of ordinary skill in the nuclear power art can provide a list of symmetric core locations for the particular core detector arrangment and core symmetry obtainable in an operating reactor. The average power sharing value among all symmetric core locations 70 is computed where the measured and synthesized values are given equal weight.in the averaging process. Next, the X-Y tilt $R^n$ of the core for measured values is determined 72 from the actual value of the power sharing map at each location, where the X-Y plane is perpendicular to the axis of the core along which the coolant flows. An index j which identifies a particular axial point or core elevation (the Z axis) is then set 74 to 1. The next step 76 removes I the effect of core tilt, so that each local power value can be reflected into symmetric locations. During this determination, the index j is compared 78 to the total number of axial points (core elevations) used in the power distribution synthesis and the index j is incremented 80 until all power distribution values have been untilted. Next, the value of the transformed power is assigned 82 to location n and all locations symmetric to location n (step II in FIG. 6). If the total number of active strings N has not been transformed 84, the index n is incremented 86.

Once the transformation II has been completed the values for interpolation weighting factors and the power values for uninstrumented locations are set to zero. This is the entry point into the loop which interpolates (step III in FIG. 6) the uninstrumental values from the transformed values and the tilt adjusted values. First, index m that identifies a particular core location is set to 1. This index value m will be later compared to M, the total number of locations in the core that are not instrumented, that is, not symmetric with any location containing an active string. Next, an index $k^m$ is set to one. This index identifies a particular location among the $K^m$ locations, where $K^m$ is the total number of locations in the core that are within distance d (center) of location m and that are symmetric with a core location that contains an active string. The weighting factor is computed 94. The weighting factor is a geometric weighting factor whose value depends on the distance d. A typical expression for the weighting factor is:

$$W(m \rightarrow k^m) = 1/a + b*[d(m \rightarrow k^m)]^2 \qquad (1)$$

where $d(m \rightarrow k^m)$ is the center to center distance between location m and location $k^m$ and the values of a and b are predetermined by experiment or by analysis by one of ordinary skill in the art. Next, axial core elevation index j is set 196 and a precalculated ratio of local power in the fuel assembly at location m to the local power in the fuel assembly at location $k^m$ is selected 98. The values of the ratio for each core location for various steps in the burn-up cycle are determined by the system designer and are available from the plant owner.

With all the variables for a particualar location now available, the process computes 100 the unnormalized contribution of a local distribution value to an interpolated value for each core location and elevation. During this loop, the elevation index j is compared 102 to the total number of axial points j and the index is incremented 104. Once the elevational interpolated values are determined, the sum of the weighting factors is computed 106. During this loop, the loop index $k^m$ is compared 108 and incremented 110 as necessary.

The interpolated values are then normalized 114 to unity. During this adjustment the location index is set 112, compared 116 and incremented 118. Once this normalization adjustment for all locations is performed, a check 120 to see if the end of the uninstrumented location calculations has been completed.

Once the interpolation process is completed the process enters a loop which transforms the tilt adjusted, transformed and interpolated power distribution values to account for the X-Y core tilt factor for each individual transformation. First a core location index 1 is set 124, the process then includes identifying 126, the core locations that are symmetric with each core location. This identification process includes identifying the symmetric locations for uninstrumented as well as instrumented locations. Once again, one of ordinary skill in the art can provide this list for a particular reactor. The next step 128 computes the average power sharing value for the core locations that are symmetric. Next, the X-Y tilt transformation factor between all locations is computed 130 after which the power distribution values are adjusted 134 for a particular location using the tilt values. During this process, the index 1 for fuel location and the index j for axial point or core elevation are incremented 138 and 142 and compared 136 and 140 as necessary.

By combining the responses from a limited number of appropriately located strings of fixed incore detectors with the responses from a full complement of core exit thermocouples as described herein, it is possible to continuously monitor the full, three dimensional core power distribution with a degree of accuracy and precision comparable to that obtainable with a full set of fixed incore detectors or with a conventional movable detector system. Since the core power distributions synthesized with the proposed system are of an accuracy and precision comparable to that obtainable with current systems, they can replace at least some of the full core flux maps now required for power distribution surveillance and for calibration purposes, thereby reducing the operating duty of the movable detector system and extending reactor life.

The many features and advantages of the invention are apparent from the detailed specification and, thus, it is intended by the appended claims to cover all such features and advantages of the invention which fall within the true spirit and scope thereof, and further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What we claim is:

1. A continuous nuclear power distribution synthesis system for a nuclear reactor core, comprising:
   fixed incore detectors positioned in the core and producing flux signals, a number of said detectors being less than a full complement of the fixed incore detectors;
   a full complement of core exit thermocouples positioned at exits of core assemblies and producing temperature signals; and
   computation means for determining power distribution of the entire core from the flux signals and temperature signals.

2. A system as recited in claim 1, wherein said computation means comprises:
   power computation means for producing power values for detector locations from the flux signals;
   tilt means for determining of an X-Y power distribution tilt within the core from the temperature signals;
   tilt adjustment means for removing the tilt from the power values and assigning the tilt adjusted power values to symmetric core locations;
   interpolation means for producing interpolated values from the tilt adjusted power values and the assigned tilt adjusted power values; and
   transform means for transforming the tilt adjusted power values, assigned tilt adjusted values and interpolated values into power distribution values.

3. A continuous nuclear power distribution synthesis system for a pressurized water nuclear reactor core, comprising:
   less than a full complement of fixed incore detectors producing flux signals;
   a full complement of core exit thermocouples producing temperature signals; and
   distribution computation means for producing a power distribution of the entire core from the flux signals, said computation means comprising:
   means for synthesizing a local power distribution from the flux signals;
   means for producing a power sharing map from the temperature signals;
   means for determining core tilt from the power sharing map;
   means for adjusting the local power distribution to remove core tilt;
   means for assigning the tilt removed local power distribution to symmetric core locations;
   means for producing an interpolated power distribution; and
   means for adjusting the tilt adjusted local power distribution, the assigned tilt removed local power distribution and the interpolated power distribution to include the tilt.

4. A method of continuous power distribution synthesis for a nuclear reactor core using a limited number of fixed incore detectors and core exit thermocouples, comprising the steps of:
   (a) monitoring flux signals produced by the detectors and temperature signals produced by the thermocouples;
   (b) producing local axial power distribution values;
   (c) producing a power sharing map; and
   (d) determining the core power distribution from the local axial power distribution values and the power sharing map.

5. A method as recited in claim 4, wherein step (d) comprises the steps of:
   (d1) determining core tilt using the power sharing map;

(d2) transforming the local axial power distribution values using the tilt and producing transformed values;
(d3) assigning the transformed values to symmetric core locations producing assigned values;
(d4) determining interpolated values from the assigned values and the transformed values;
(d5) transforming the transformed values, the assigned values and the interpolated values into power distribution values incorporating the core tilt.

6. A method of continuous power distribution synthesis of a pressurized water nuclear reactor using flux detector signals and core exit thermocouple temperature signals, said method comprising the steps of:

(a) synthesizing local power distributions from the flux signals;
(b) producing a power sharing map from the temperature signals;
(c) determining core tilt from the power sharing map;
(d) adjusting the local power distributions to remove core tilt;
(e) assigning the tilt removed local power distributions to symmetric core locations;
(f) producing interpolated power distributions; and
(g) adjusting the tilt adjusted local power distributions, the assigned tilt removed local power distributions and the interpolated power distributions to include the tilt.

* * * * *